(12) United States Patent
Baker et al.

(10) Patent No.: X8545
(45) Date of Patent: Dec. 17, 1834

(54) PRESS, COTTON & HAY, &C.

(76) Inventors: Samuel T. Baker; T. Robinson

Samuel T. Baker of Gorham. Maine
Letters Patent

The Schedule referred to in these Letters Patent, and making part of the same. containing a description in the words of the said Samuel T. Baker himself. of his improvement in the machine or Press, for compressing Hay. Cotton. Hops. Tobacco, chase or other compressible commodity.

To all to whom these presents shall come. Be it Known that I Samuel T. Baker, of Gorham, in the County of Cumberland, and State of Maine have invented a new and useful improvement in a machine, or Press, for compressing hay, cotton, hops, tobacco, cheese or other compressible commodity, and that the following is a full and exact description of the Construction and operation of the said machine, as invented or improved by me, viz:
The frame of the press consists of two sills, seven feet long and six inches square; two posts framed into the sills, and constructed of three planks, which are fourteen feet high, and three inches thick, the three planks make the posts two feet and six inches wide; The Posts are firmly braced; three pieces of timber five or six inches square are framed into, and near the bottom of the posts called Bed pieces upon which rests the bottom of the box or barrel in which the Hay. Cotton. or other commodity is compressed The Box is seven feet high, three and a half feet wide and two feet and four inches in depth from front to back. the front and back sides [illegible] of the box are in two parts, the lower parts being connected to the upper by hinges and forming doors which open for the purpose of taking out the hay or other thing when compressed the lower part of one of the other sides of the box is also separate from the upper part and moveable to facilitate the removal of the article compressed. The doors and moveable side of the box are fastened and confined when the pressure is applied by bars.

or joist which surround or hoop the lower part of the box, and
which are secured in their places by iron fastenings and spring keys.
The upper part of the box is confined by pieces of joist which
are framed together and remain fixed, being fastened to the plank
posts by bolts. In the plank posts and above the box are
placed two horizontal shafts about nine inches in diameter
if of wood, or of less diameter if of iron, which may or may
not run or turn, on friction Rollers. upon the middle of the
lower shaft which is about three feet above the box is a cog
wheel two and a half feet in diameter (or it may be of a great
er or less diameter) which may be of wood, with a cast iron
rim with cogs or it may be wholly of cast iron, and this
wheel is turned by a pinion on the upper shaft (or there may be
instead of said central wheel and pinion, two similar cog whee[ls]
one upon each end of the lower shaft within the posts to be turn
ed by corresponding pinions on the upper shaft.) upon the low
er shaft are two pinions which are equidistant from the central
cog wheel, and which match into cast iron cogs attached, with
the plates upon which the cogs are cast to two slides or pistons of
wood about six inches square; upon the lower ends of these
slides or pistons, is fixed the follower or covering which is pressed
upon the Hay, Cotton, or other commodity, These slides or pistons
stand in a perpendicular position between the upper and lower
shaft. they are moved up and down by the pinions on the lower
shaft, playing upon the cogs attached to them as aforesaid, and
they are kept firm and secure, in their proper places by grooves
in the upper shaft in which the back part of the slides or pistons
move. The upper shaft is sufficiently above and distant from the
lower shaft to allow the slides, or pistons to move up and down
perpendicularly between the two, and also to permit the pinion upon
the upper shaft to match into and turn the cog wheel, and with
it the lower shaft, a cross bar or cap piece is framed upon the

UNITED STATES PATENT OFFICE
PTO – BOYERS, PA DUTY STATION

PAGE NOT AVAILABLE

PATENT NUMBER X8545 FOR THE ISSUE DATE 12/17/1834 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing TEXT Pg 3 To END

DATA CONVERSION OPERATION
BOYERS, PA